United States Patent [19]

Nagashima

[11] Patent Number: 4,524,394

[45] Date of Patent: Jun. 18, 1985

[54] IMAGE FORMATION SYSTEM

[75] Inventor: Nao Nagashima, Yokohama, Japan

[73] Assignee: Canon Kabushiki Kaisha, Tokyo, Japan

[21] Appl. No.: 394,788

[22] Filed: Jul. 2, 1982

[30] Foreign Application Priority Data

Jul. 10, 1981 [JP] Japan ................. 56-108720

[51] Int. Cl.³ .............................. H04M 1/22
[52] U.S. Cl. .................... 358/296; 358/300; 364/479
[58] Field of Search ............. 358/296, 300, 257, 256; 364/479

[56] References Cited

U.S. PATENT DOCUMENTS

3,678,180  7/1972  Bond .................... 358/296
3,893,175  7/1975  Solomon ............... 364/479
4,417,282 11/1983  Yamamoto ........... 358/296

Primary Examiner—John C. Martin
Assistant Examiner—Edward L. Coles
Attorney, Agent, or Firm—Fitzpatrick, Cella, Harper & Scinto

[57] ABSTRACT

An image formation system has a plurality of devices which output image data such as an original reader or a general purpose computer, a semiconductor laser to record an image on a photosensitive drum, a sorter with bins to store the recording medium from the laser, an image memory control, and a sensor for sensing and storing the recording medium in a bin of the sorter corresponding to the original reader or the general purpose computer. The system is capable of sorting the output recording media in accordance with the original reader or the general purpose computer. The output recording media need not be resorted manually.

7 Claims, 10 Drawing Figures

| INPUT | ASSIGNMENT DEVICE | STATUS | OUTPUT | ASSIGNMENT DEVICE | STATUS |
|---|---|---|---|---|---|
| I 1 | ORIGINAL READER | BUSY | O1 | PRINTER | BUSY |
| I 2 | COMMUNICATION DEVICE | WAIT | O2 | COMMUNICATION DEVICE | WAIT |
| I 3 | DOCUMENT DRAWING UP DEVICE | BUSY | O3 | INTERNAL CONNECTION (I4) | — |
| I 4 | INTERNAL CONNECTION (O3) | — | | | |

FIG. 4

| MEMORY NO. | CONTENT | ASSIGNMENT DEVICE | I/O |
|---|---|---|---|
| 1 | RAM 1 | PRINTER | OUTPUT |
| 2 | RAM 2 | UNUSED | — |
| 3 | DISK 1 | ORIGINAL READER | INPUT |
| 4 | DISK 2 | DOCUMENT DRAWING UP DEVICE | INPUT |

FIG. 5

| BIN NO. | ASSIGNMENT DEVICE | SORTING |
|---|---|---|
| 1 ~ 5 | ORIGINAL READER | OVER |
| 6 ~ 15 | DOCUMENT DRAWING UP DEVICE | NOT YET |
| 16 ~ 25 | COMMUNICATION DEVICE | NOT YET |
| 25 ~ 40 | UNUSED | — |

IMAGE FORMATION SYSTEM

BACKGROUND OF THE INVENTION

1. Field of the Invention

The present invention relates to an image formation system which records on a recording medium image data input through an plurality of image data output devices, and which stores the recording medium in a recording medium storing unit.

2. Description of the Prior Art

Recording devices for electrically recording images with lasers or the like are recent innovations. The recording devices of this type are used not only for printing documents but also for printing calculation results or documents created by document preparation devices or facsimiles.

If a recording medium storing device such as a sorter is connected to the terminal ends of a plurality of recording devices as image data output devices to classify and store recording media (to be referred to as paper sheets hereinafter) but if it is not capable of sorting in accordance with each device, the paper sheets output by the respective image data output devices are mixed together and must be manually classified thereafter. This presents an inconvenience to the operator.

SUMMARY OF THE INVENTION

The present invention has been made in consideration of this and has for its object to provide an image formation system which is capable of classifying and storing paper sheets output by a plurality of image data output devices on which data is recorded without causing an inconvenience to the operator.

It is another object of the present invention to provide an image formation system which discriminates a device form which a paper sheet with image data recorded thereon is output and which classifies and stores the paper sheets into a predetermined storing unit in accordance with the discrimination result.

The above and other objects of the present invention will become apparent from the following description when taken in conjunction with the accompanying drawings.

DETAILED DESCRIPTION OF THE PREFERRED EMBODIMENTS

The preferred embodiments of the present invention will now be described in detail with reference to the accompanying drawings.

Figure 1A:
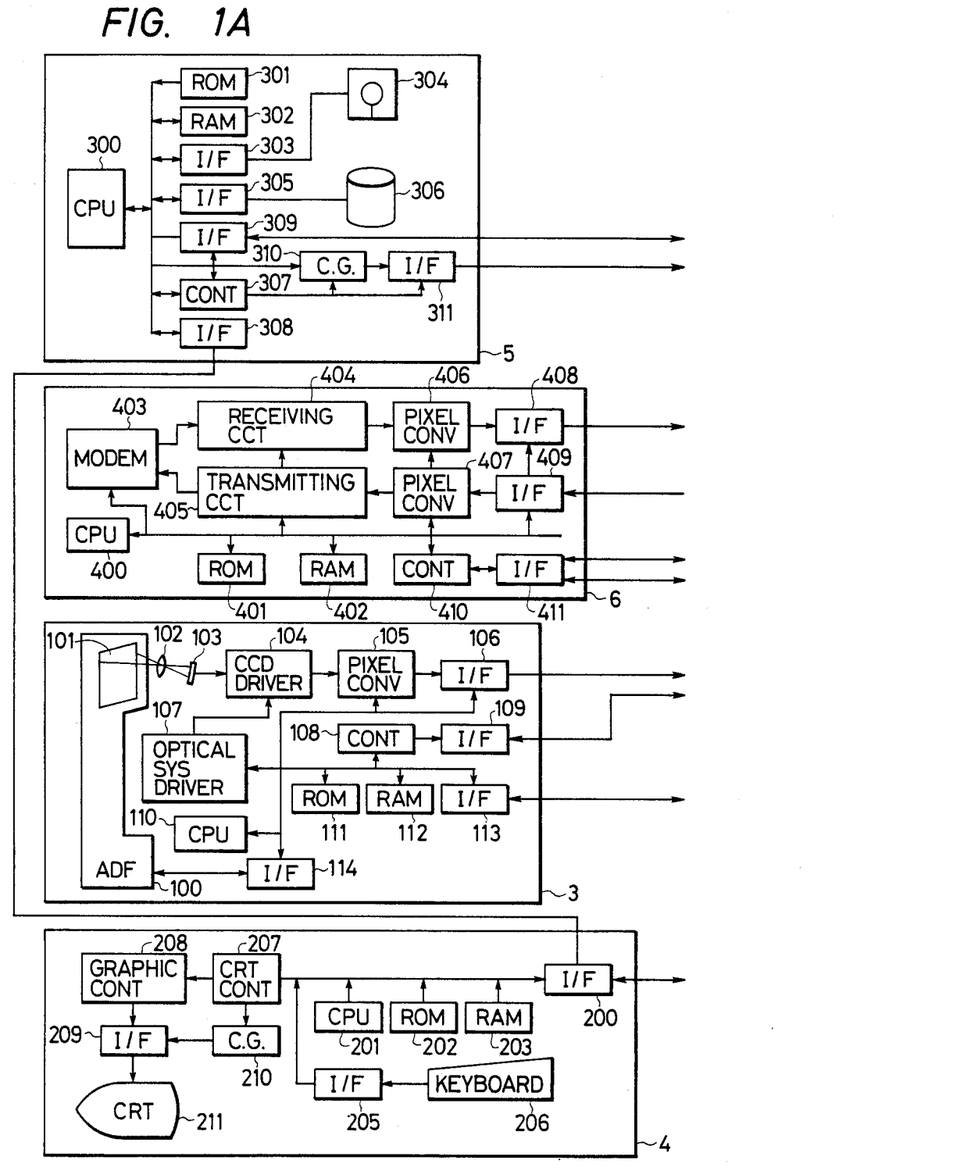
FIG. 1 composed of FIG. 1A and FIG. 1B a block diagram showing the configuration of a system according to the present invention.
Figure 1B:
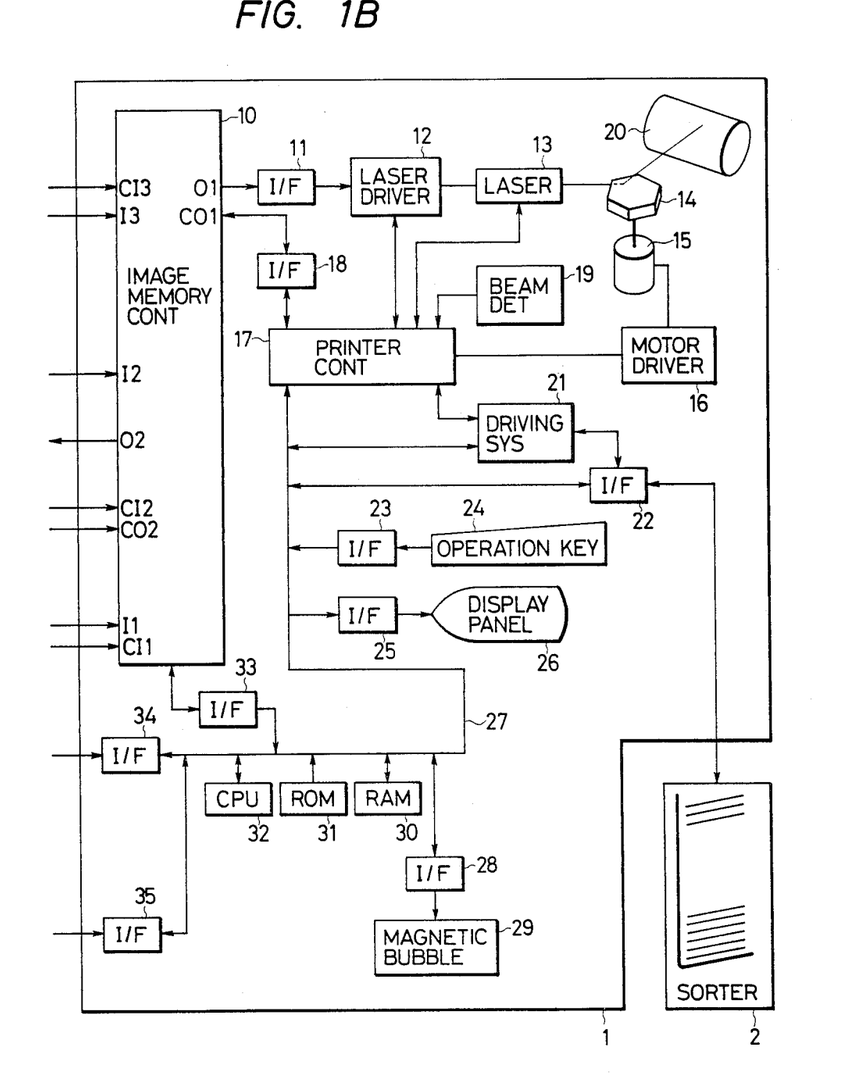

FIG. 1 composed of FIG. 1A and FIG. 1B a block diagram showing an embodiment of an image formation system according to the present invention. A printer 1 forms an electrostatic latent image on a photosensitive body with a laser means in accordance with input image data and transfers it onto a paper sheet after development. A sorter 2 classifies and stores printed paper sheets from the printer 1. An original reader 3 reads image data on an original by a CCD and supplies the read image data to the printer 1. A CRT display 4 displays the status of the printer 1. A general purpose computer 5 is used to create a document, to perform calculations and so on. A communication device 6 exchanges image data with a communication line such as a telephone line. The printer 1 is controlled by a CPU 32.

The CPU 32 has a program storing ROM 31 and a working RAM 30 and controls the original reader 3 through the printer 1, an image memory control 10, and an interface circuit 34. The printer 1 is driven or stopped by depressing an operation key 24 or a key on a keyboard 206 of the CRT display 4. When the operation key 24 is depressed, data is transferred to the CPU 32 through an interface circuit 23 to be analyzed and processed. A display panel 26 displays the status such as execution, stop, or wait to the operator. The display contents may be changed by the CPU 32.

In response to a command from the CPU 32, a printer control 17 and a main body drive system 21 write image data on a photosensitive body 20 by a laser 13. An image is formed on a paper sheet utilizing the electrostatic image formation method. The paper sheet with the image formed thereon is classified and stored by the sorter 2. A signal from the CPU 32 is supplied to the sorter 2 through an interface circuit 22. An image data signal from the image memory control 10 is supplied through an interface circuit 11 and a laser driver circuit 12 to the laser 13 which then produces a laser beam. The laser beam is synchronized by a polygonal mirror 14 for reflecting it, a polygonal motor 15 for driving it, a motor driver 16 for controlling the polygonal motor 15, and a beam detector 19 for detecting the position of the laser beam. The laser beam then forms an image on the photosensitive body 20. The CPU 32 and the image memory control 10 exchange control signals through an interface circuit 33.

The CPU 32 supplies to the image memory control 10 an operation command for the image data, a switch signal for a switch to the input terminal of the image memory, signals for input, output and stop of the image data, and the like. On the other hand, the image memory control 10 supplies to the CPU 32 signals representing the statuses of the image memory or input and output terminals.

The interface circuit 34 relays the exchange of control signals between the original reader 3 and the CPU 32.

The original reader 3 reads an original 101 fed by an automatic document feeder 100 by a lens 102 and a CCD 103. An image data signal from the CCD 103 is supplied to the image memory control 10 through a CCD driver 104, an image control 105 and an interface circuit 106. The operating timings of the original reader 3 are determined by a CPU 110, a program storing ROM 111, a working RAM 112, interface circuit circuits 113 and 114, an optical system driver 107, and an interface circuit 106. The original reader 3 exchanges data on the type, status of the reader or the like with the image memory control 10 through a control 108 and an interface circuit 109.

The CRT display 4 is used as a terminal device of the printer 1 and the general purpose computer 3 through an interface circuit 200. The CRT display 4 has a CPU 201, a program storing ROM 202, a working RAM 203, a keyboard 206, an interface circuit 205, a CRT control 207, a graphic control 208, a character generator 210 for generating dot pattern signals, an interface circuit 209 and a CRT 211. With these parts, the CRT display 4 is capable of input and output of any character data, or normal display or graphic display of such data. The standard works which involve predetermined image processing operations and predetermined number of reproduced copies are input in the form of a program through the keyboard 206 of the CRT display 4 and are transferred to a magnetic bubble 29 through an interface circuit 28 such that the printer 1 can execute the program. In this manner, series of standard works may be automatically continuously performed with simple operations.

The general purpose computer 5 has a CPU 300, a program storing ROM 301, a working RAM 302, an interface circuit 303, a floppy disk 304, an interface circuit 305, a magnetic disk 306, and an interface circuit 308. Using the CRT display 4, the general purpose computer 5 performs preparation of documents or calculations. The documents or calculation results to be recorded by the printer 1 are output as image data to the image memory control 10 through a control 307, a character generator 310, and an interface circuit 311. An interface circuit 309 exchanges data such as the type or status of the computer with the image memory control 10.

The communication device 6 transmits and receives image data signals through a communication circuit 412 and a modem 403. The communication circuit 6 has a CPU 400, a program storing ROM 401, a working RAM 402, a receiving circuit 404, a picture element conversion circuit 406 for converting the compressed image data into data which can be handled by the image memory control 10, interface circuits 408 and 409, a picture element conversion circuit 407 for converting the data from the image memory control 10 into data for the communication line, and a transmitting circuit 405. The image memory control 10 exchanges with the communication device 6 data of the type and status of the communication device 6 through an interface circuit 411 and a control 410.

Selection of the original reader 3, the general purpose computer 5 and the communication device 6 is performed with a command from the keyboard 206.

Referring to FIG. 1, the image memory control 10 exchanges image data signals and control signals with the original reader 3, the general purpose computer 5, the communication device 6 and the printer 1 mainly having the laser 13, so that the formats of the image data and control signals are standardized for general purpose use. Furthermore, as shown in FIG. 1, the entire system is divided into the device for generating image data, the device for storing and controlling the image data, the device for recording the image data, and, at the same time, the signal formats are standardized. For this reason, design of each device of the system is easy. When a new terminal is to be added to the system, the design of the entire system need not be modified.

The image memory control 10 will now be described with reference to FIG. 2.

Figure 2:
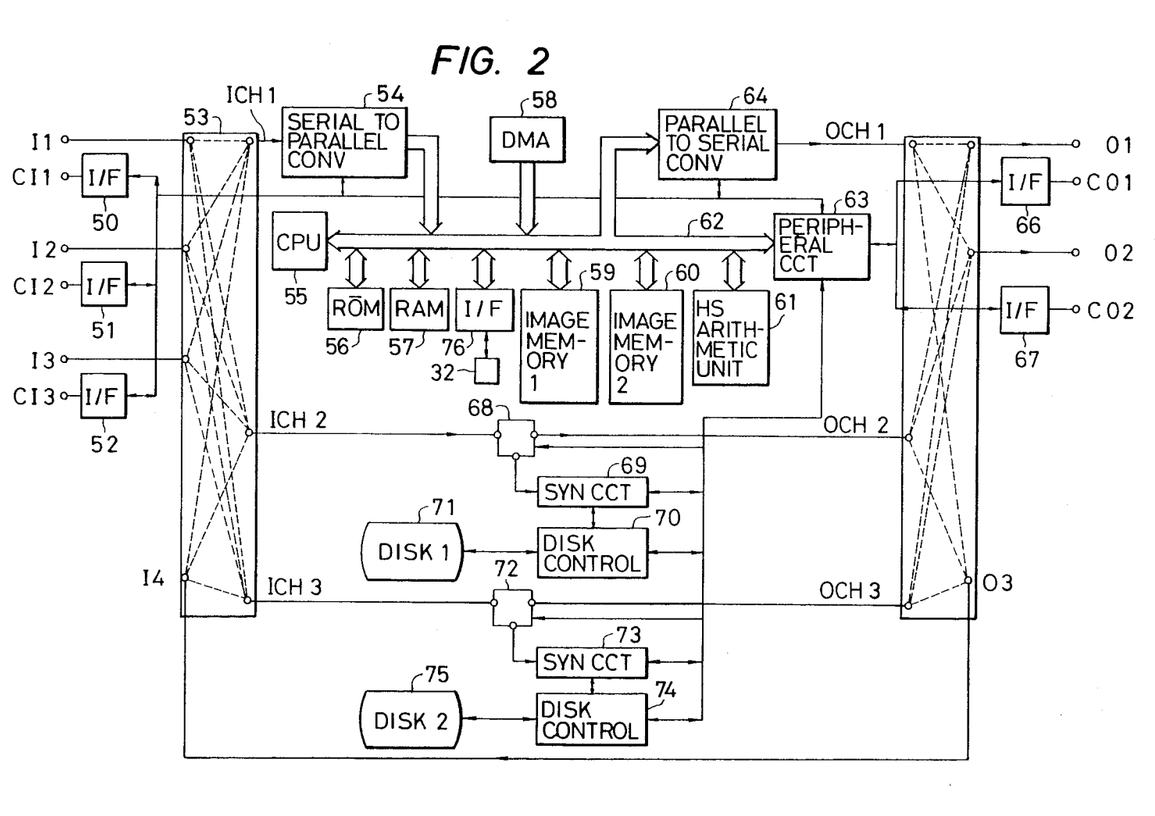
FIG. 2 is a block diagram showing the configuration of an image memory control.

FIG. 2 is a block diagram of an example of the image memory control 10. Referring to FIG. 2, image data input terminals I1, I2 and I3 receive the image data from the original reader 3, the general purpose computer 5, and the communication device 6. Control signal input/output terminals CI1, CI2 and CI3 correspond to the image data input terminals I1, I2 and I3, respectively. Similarly, control input/output terminals CO1 and CO2 correspond to image data output terminals O1 and O2, respectively. The terminals I1, I2, I3, CI1, CI2, CI3, O1, O2, CO1 and CO2 respectively correspond to the same symbols in FIG. 1. An input terminal I4 and an output terminal O3 are for data transfer within the image memory control 10 and are internally connected. Data from different image memory channels may be transferred through this internally connected signal path.

The image memory channels include an image memory channel 1 which mainly includes a CPU 55 and which performs image data processing such as image data editing by operating image memories 59 and 60 comprising semiconductor memories through a system bus 62; an image memory channel 2 comprising a magnetic disk 71; and an image memory channel 3 comprising a magnetic disk 75. The respective channels receive the image data through terminals ICH1, ICH2 and ICH3 and output the image data through terminals OCH1, OCH2 and OCH3.

The CPU 55 performs the image data operation as described above using a program storing ROM 56 and a working RAM 57. In addition to this, the CPU 55 controls, using a peripheral control 63 through the system bus 62, interface circuits 50, 51, 52, 66 and 67; multiplexers 53 and 65; input/output change-over switches 68 and 72; the image memory channel 2; and the image memory channel 3.

A serial-to parallel conversion circuit 54 receives the image data in the form of serial data at the terminal ICH1 into parallel data for allowing handling at the image memory 59 or 60 and the CPU 55. In general, data transfer is performed with serial data since the number of signal lines may then be reduced. In consideration of this, in this example, serial image data is used for input to or output from the image memory control 10, and input to and output from the internal image memory channels.

Conversely, a parallel-to serial conversion circuit 64 converts the image data from the image memories 59 and 60 into serial data which is output from the terminal OCH1. With the use of the serial-to-parallel conversion circuit 54 and the parallel-to-serial conversion circuit 64, the image memory channel 1 may be apparently handled as an image memory which receives and outputs serial data. Transfer of image data among the respective channels may be facilitated by standardizing the formats of the serial data. A DMA circuit 58 is used to allow high-speed data transfer from the serial-to-parallel conversion circuit 54, to the image memory 59 or 60 and to the parallel-to-serial circuit 64 without using the CPU 55. A high-speed arithmetic device 61 is used to enhance the airthmetic capacity of the CPU 55 when complex, or high-speed, or large quantity computation is required.

The CPUs 32 and 55 exchange the various types of control signals through interface circuits 76 and 77.

The image memory channels 2 and 3 are image memories of the same configuration and respectively comprise the multiplexers 53 and 65, synchronization circuit 69 and 73 for synchronizing the input and output image data with the image data stored in or reproduced from the disk; disk controls 70 and 74 for controlling the magnetic disks; and the magentic disks 71 and 75. For storing the image data on the magnetic disks, the multiplexers 53 and 65 are connected to the terminals ICH2 and ICH3. For reproducing the image data, the multiplexers 53 and 65 are connected to the terminals OCH2 and OCH3.

The multiplexer 53 changes over the terminals I1, I2, I3 and I4 connected to the terminals ICH1, ICH2 and ICH3 in the manner as shown by dotted lines in FIG. 2. The input terminals I1, I2, I3 and I4 are selectively connected or disconnected from the terminals ICH1, ICH2 and ICH3. For example, connection of both the terminals I1 and I2 to the terminal ICH1 is prohibited since the synchronization between the two signals is difficult. On the other hand, overlapped connection of the terminals ICH1 and ICH2 to the terminal I1 is allowed. Simultaneous storage of the image data into a plurality of image memory channels is allowed.

The multiplexer 65 changes over the output terminals O1, O2 and O3 connected to the terminals OCH1, OCH2 and OCH3 in the manner shown by the dotted lines in FIG. 2 as in the case of the multiplexer 51. In this case, more than one output terminal may be connected to the terminals OH1, OH2 and OH3, respectively, for allowing simultaneous transfer of image data to a plurality of devices or image memory channels. However, since it is difficult to attain synchronization between two signals, the overlapped connections of the output terminals O1, O2 and O3 to the terminals OCH1, OCH2 and OCH3 is prohibited.

The change-over of the connections by the multiplexers 53 and 65 is performed by the CPU 55. The CPU 55 automatically discriminates if overlapped connections may be made and performs connections.

The control signal lines for the control signal input-/output terminals CI1, CI2, CI3, CO1 and CO2 will now be described. In this embodiment, each control signal line is of 8-bit configuration and may be described as follows:

(a) Control signal lines 0 to 2

Signal line for discriminating the type of device connected. The signal lines are determined as in Table 1 below and data is transferred from the device to the CPU 55.

TABLE 1

| Signal line | | | |  |
|---|---|---|---|---|
| 2 | 1 | 0 | Device Connected | |
| 0 | 0 | 0 | Original reader | |
| 0 | 0 | 1 | Office computer | |
| 0 | 1 | 0 | Document preparing device | General purpose computer |
| 0 | 1 | 1 | Communicating device | |
| 1 | 0 | 0 | | |
| 1 | 0 | 1 | Unused | |
| 1 | 1 | 0 | | |
| 1 | 1 | 1 | Unconnected | |

(b) Control signal line 3

The signal line representing the flow of the signals between the devices and the image memory channels. Data is transferred from the device to the CPU 55.

(b-1) If the control signal line 3 is at logic level "1", the image data is transferred from the device to the image memory channel.

(b-2) If the control signal line 3 is at logic level "0", the image data is transferred from the image memory channel to the device.

(c) Control signal line 4

The signal line for the CPU 55 to confirm if the device is in the ready to use state or not.

(c-1) If the control signal line 4 is at logic level "1", the device cannot be used.

(c-2) If the control signal line 4 is at logic level "0", the device cannot be used.

(d) Control signal line 5

The signal line for the CPU 55 to confirm if the device is in operation.

(d-1) If the control signal line 5 is at logic level "1", the device is in operation.

(d-2) If the control signal line 5 is at logic level "0", the device is not in operation.

(e) Control signal line 6

The signal line for the device to request the initialization to the CPU 55.

(e-1) If the control signal line 6 is at logic level "1", the initialization is requested.

(e-2) If the control signal line 6 is at logic level "0", the request is not made.

(f) Control signal line 7

The response signal line from the CPU 55 to the control signal line 6.

(f-1) If the control signal line 7 is at logic level "1", the operation is enabled.

(f-2) If the control signal line 7 is at logic level "0", the operation is disabled.

With the use of the control signal lines as described above, the CPU 55 can confirm which one of the devices is connected to the image data input terminals CI1, CI2 and CI3 and to the image data output terminals O1 and O2. The CPU 55 can then control each device.

Figure 3:
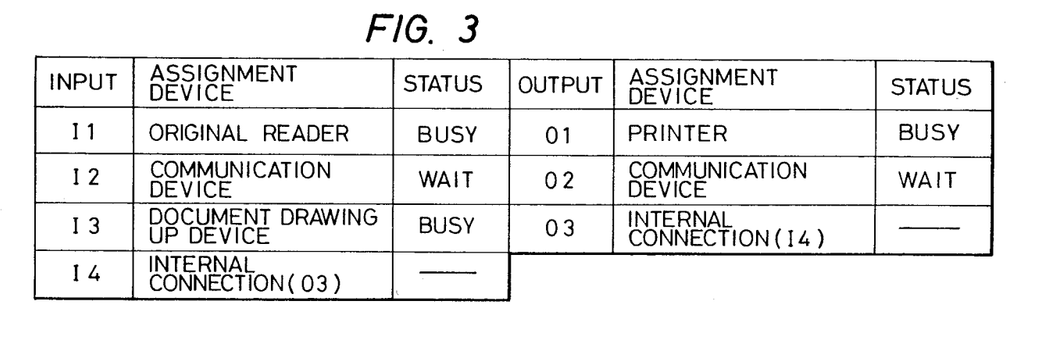
FIGS. 3 to 5 are tables showing examples of displays on a CRT.
Figure 4:
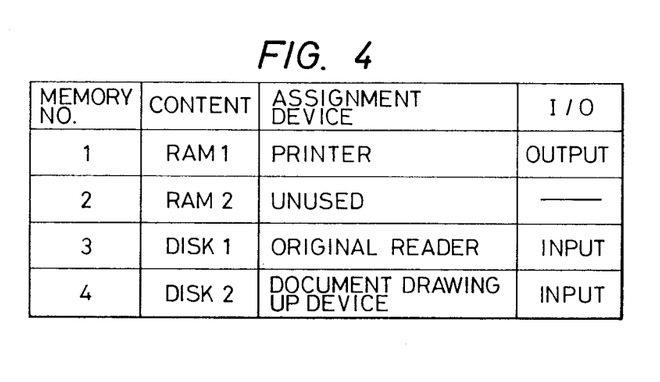
Figure 5:
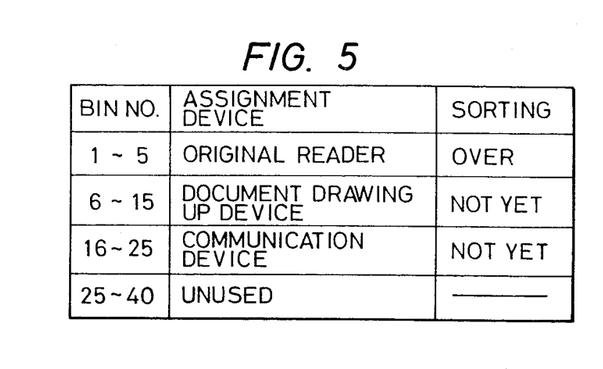

In response to the command input through the keyboard 206, the CRT display 4 can display the use status of each device connected to the input and output terminals of the image memory control 10, the use status of the image memories, and the assignment and the use status of the sorter bins, as shown in FIGS. 3 to 5.

In the embodiment described above, a CRT terminal device is used for display. However, it is also possible to use a device for recording characters such as a general printer to provide data as shown in FIGS. 3 to 5, as needed.

If image data is transmitted to the communication device 6 while the original reader 3 or the general purpose computer 5 is in operation, the received image data may be stored using the image memory channel which is not under use.

Figure 6:
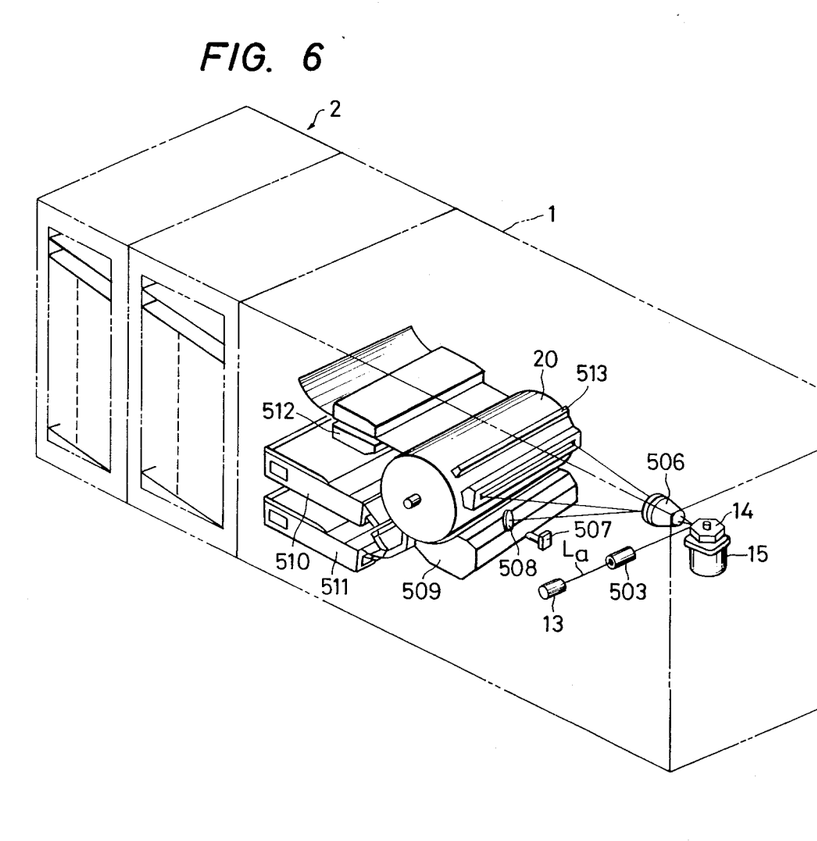
FIG. 6 is a perspective view of a recording device and a sorter.

FIG. 6 is a perspective view showing the configuration of the image examples of the printer and the sorter shown in FIG. 1.

The printer is of electrophotographic type using a laser beam. The photosensitive body or the photosensitive drum 20 is rotatably supported within a housing. The laser 13 comprises a semiconductor laser which produces a laser beam La. The laser beam La becomes incident on a beam expander 503 and is output therefrom as a laser beam having a predetermined beam diameter. The laser beam then becomes incident on the polygonal mirror 14 having a plurality of mirror surfaces. The polygonal mirror 14 is rotated at a predetermined speed by the polygonal motor 15. The laser beam received from the beam expandar 503 is horizontally deflected by the polygonal mirror 14. Through an imaging lens 506 having f-θ characteristics, the laser beam then forms a spot on the photosensitive drum 20 which is charged to a predetermined polarity.

A beam detector 507 detects the laser beam reflected by a reflecting mirror 508. The detection signal output from the beam detector 507 determines the timing of the modulation operation of the semiconductor laser 13 so as to supply desired optical data onto the photosensitive drum 20.

An electrostatic latent image is formed on the photosensitive drum 20 by the laser beam incident thereon. After being visualized by a developing unit 509, the image is transferred to a paper sheet housed within one of cassettes 510 and 511. The paper sheet with the image thereon passes through a fixing unit 512, and the image is fixed on the paper sheet. The paper sheet with the image is output from an outlet port (not shown) as a hard copy. The hard copy is supplied to the sorter 2 which is, in turn, connected to the printer 1.

Figure 7:
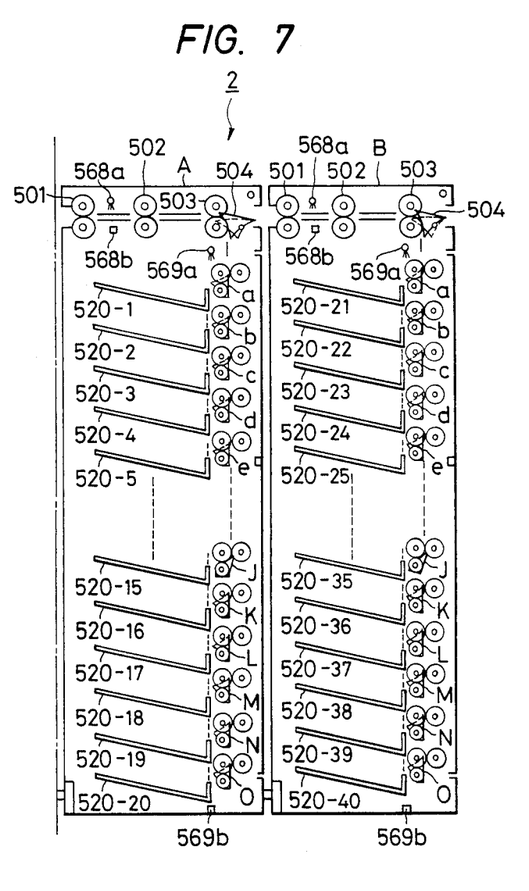
FIG. 7 is a sectional view of the sorter.

FIG. 7 is a detailed sectional view of the sorter 2. In this embodiment, sorters A and B each comprising twenty bins are connected; bins 520-1 to 520-5 of the sorter A are assigned to the original reader, bins 520-6 to 520-15 are assigned to the general purpose computer, and bins 520-16 to 520-25 are assigned to the communication device.

The mode of operation of the sorter 2 will now be described briefly. When a recorded paper sheet is supplied to the sorter 2, it is taken inside the sorter 2 by constantly rotating rollers 501 and is conveyed by rollers 502 and 503. The paper sheet is supplied to the sorter A if a change-over plate 504 is in the state indicated by the solid line and is supplied to the sorter B if the change-over plate 504 is in the state indicated by the broken line. When the paper sheet in either sorter is detected by a sensor comprising a light-emitting element 568a and a light-receiving element 568b, one of pawls a to o corresponding to the selected bin assigned to the selected device is brought into the state indicated by the solid line and the paper sheet is stored in this bin. The paper sheets are continuously stored in one bin to a predetermined number and they are stored in the next bin thereafter. When the storage of the paper sheet which is the last of the predetermined number of paper sheets is detected by a sensor comprising a light-emitting element 569a and a light-receiving element 569b, the pawl returns to the state indicated by the broken line. Then, the pawl for the next bin is brought to the state indicated by the solid line at the timing as described above, and is stored in the bin in a similar manner. The paper sheets may also be supplied sequentially one into one bin within the range of the assigned bins. It is also possible to prohibit further storage of the paper sheets if the assinged bins are full or to store the extra paper sheets to the unused bin.

Figure 8:
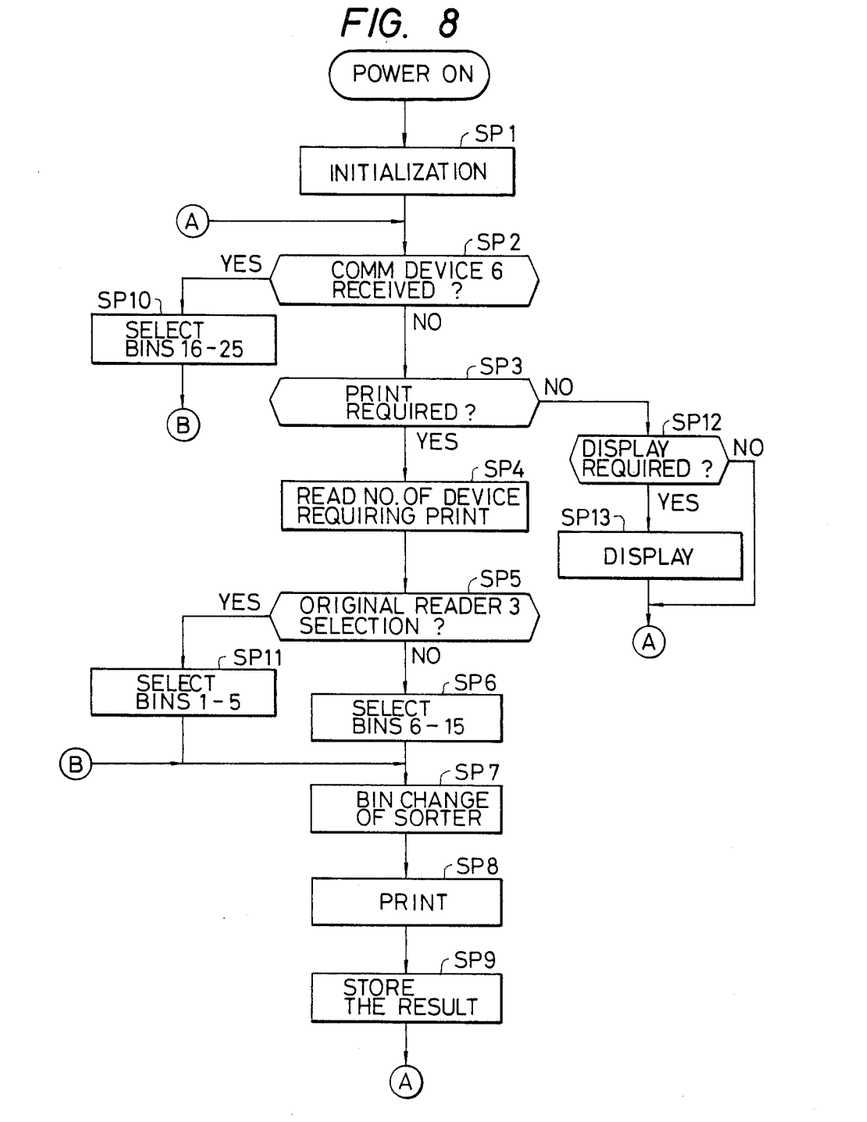
FIG. 8 is a flowchart showing the control flow according to an embodiment of the present invention.

FIG. 8 is a flowchart showing the control flow according to the present invention. The flow of operation of the system of the present invention will now be described with reference to this flowchart.

In step Sp1, the RAMs, the output ports and so on are initialized. After step Sp1, the control enters the loop for controlling the sorter and displaying. In step Sp2, it is discriminated if the communication device 6 is in the ready state for reception. If YES in step Sp2, the flow advances to step Sp10 wherein the bins 520-16 to 520-25 assigned to the communication device 6 in accordance with the sorter bin assignment table are selected. The flow then advances to step S7.

On the other hand, if NO in step Sp2, it is discriminated in step S3 if a print request is available from the operation key 24 or the keyboard 206. If YES in step Sp3, the device number of the device which has output the print request is read in step Sp4. It is then discriminated in step Sp5 is the read device number is that of the original reader 3. If YES in step Sp5, the bins 520-1 to 520-5 for the original reader 3 are selected in accordance with the sorter bin assignment table in step Sp11. The flow then advances to step Sp7. If NO in step Sp5, the bins 520-6 to 520-15 assigned to the general purpose computer are selected in step S6 and the flow then advances to step Sp7.

In step Sp7, the sorter bin numbers slected in the manner as described above are output to the sorter and the sorter bins are changed.

In step Sp8, printing is performed and the printed paper sheet is output to the corresponding bin of the selected device. In step Sp9, data such as the number of printed paper sheets is stored to allow display of such data upon request.

If NO in step Sp3, it is then discriminated in step Sp12 if a display request of the data is available. If YES in step Sp12, the flow advances to step Sp13 to perform display.

The sorter bin assignment table shows which bins are assigned to which device number. The sorter numbers are stored in the areas allocated for the respective devices using ROMs or switches.

In this embodiment, it is confirmed if the communication device 6 is in the ready state for reception before the device number which has output a print request is read.

Figure 9:
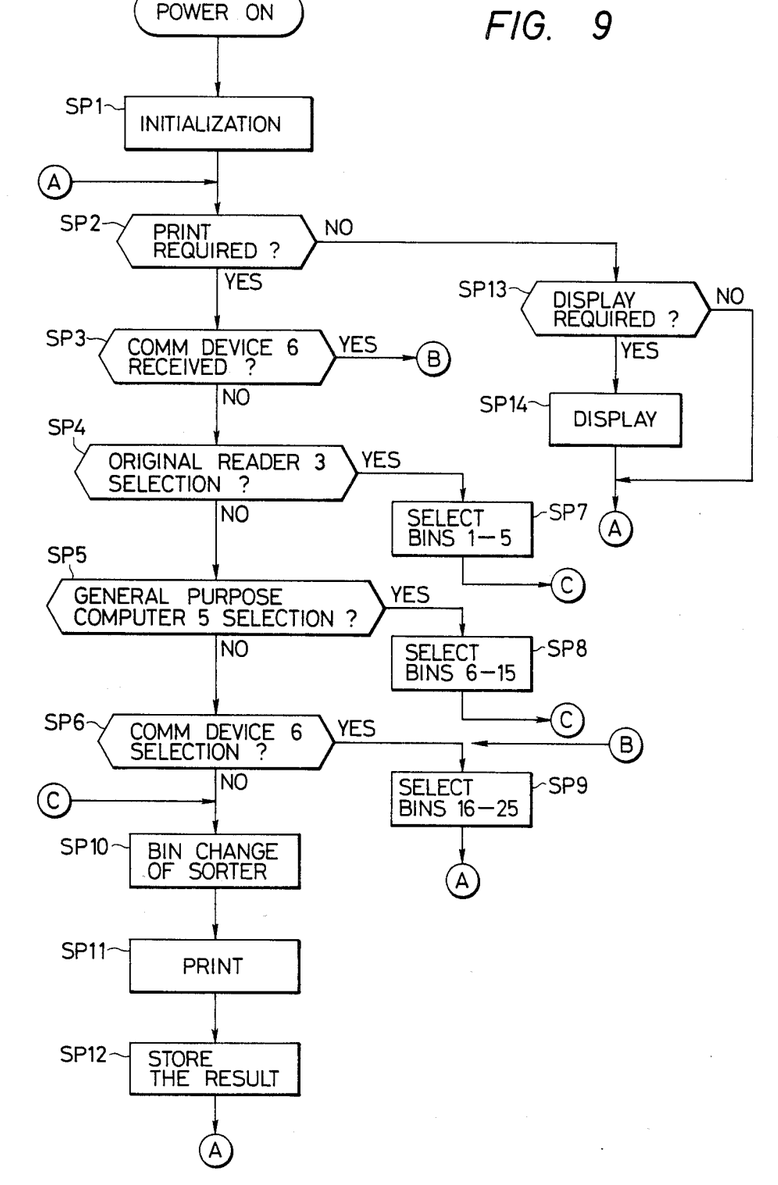
FIG. 9 is a flowchart showing the control flow according to another embodiment of the present invention.

FIG. 9 is a flowchart for explaining the mode of operation of a system according to another embodiment of the present invention. In this embodiment, if the communication device 6 receives image data while the original reader 3 or the general purpose computer 5 is in operation, the received image data is stored using the image memory channel which is not in operation. The flow of operation will now be described. In step Sp1, the RAMs, the output ports and so on are initialized. In step Sp2, it is discriminated if a print request is available. If YES in step Sp2, it is then discriminated in step Sp3 if the communication device 6 is in the ready state for reception. If NO in step Sp3, the device number of the device which has output the print request is read in steps Sp4 to Sp6. In steps Sp7 to Sp9, the sorter bins for the device of the read number are determined in accordance with the sorter bin assignment table. If YES in step Sp3, the flow advances to step Sp9.

In this embodiment, if the communication device 6 receives image data while the original reader 3 or the communication device 6 is in operation, the received image data is stored using the image memory channel which is not in operation. Therefore, the received image data can be output by selecting the communication device 6 in step Sp6.

In step Sp10, the sorter bin numbers read out in steps Sp7 to 9 are output to the sorter and the bins of the sorter are changed.

In step Sp11, printing is performed. The printed paper sheet is output to the bin corresponding to the sorter. In step Sp12, the data on the number of printed paper sheet is stored to allow display of such data upon request.

If NO in step Sp2, it is then discriminated in step Sp13 if a display request is available. If YES in step Sp13, the flow advances to step Sp14 to perform display.

The respective operations of the "change of the sorter bins", "print", and "storage of the number of printed paper sheets" in steps Sp10 to Sp12 are performed if flags set upon selection of the respective devices remain set.

In this manner, since the sorter bins are selected and the paper sheets are output in accordance with the device which has output image data, the printed paper sheets need not be classified even if a plurality of image data output devices are used. The working efficiency is thus improved.

Since it is first checked if the communication device is in the ready state for reception, reception of the image data may be immediately commenced upon request.

What I claim is:

1. An image formation system, comprising:
   processing means for processing character data for output as image data;
   reading means for reading image data from an original;
   recording means for recording the image data output from either said processing means or from said reading means onto a recording medium;
   storage means having a plurality of storage sections for storing therein the recording medium from said recording medium; and
   control means for controlling said storage means to differentiate a storage mode of the recording medium in accordance with selection of said processing means or said reading means.

2. A system according to claim 1 wherein said control means controls said storage means to store a recording medium on which image data from said processing means has been recorded and a recording medium on which image data from said reading means has been recorded in different storage sections.

3. An image formation system comprising:
   processing means for processing character data for output as image data;
   communication means for transmitting and receiving image data;
   recording means for recording on a recording medium the image data output from either said processing means or said communication means;
   storage means having a plurality of storage sections for storing therein the recording medium from said recording means; and
   control means for controlling said storage means to differentiate a storage mode of the recording medium in accordance with selection of said processing means or said communication means.

4. A system according to claim 3, wherein said control means controls said storage means to store a recording medium on which image data from said processing means has been recorded and a recording medium on which the image data from said communication means has been recorded in different storage sections.

5. A system according to claim 3, wherein said control means senses the selection status of said communication means prior to sensing the selection status of said processing means.

6. A system according to claim 5, wherein the selection status of said communication means is a reception status.

7. A system according to claim 3, wherein said recording means records an image on the recording medium with a laser beam.

* * * * *

UNITED STATES PATENT AND TRADEMARK OFFICE
CERTIFICATE OF CORRECTION

PATENT NO. : 4,524,394
DATED : June 18, 1985
INVENTOR(S) : NAO NAGASHIMA

It is certified that error appears in the above-identified patent and that said Letters Patent is hereby corrected as shown below:

Column 1, line 48, after "1B" insert --is--.

Column 2, line 1, after "1B" insert --is--;

line 66, change "107" to --108--;

line 67, change "106" to --107--.

Column 4, line 60, change "airthmetic" to --arithmetic--.

Column 7, line 54, change "assinged" to --assigned--.

Column 8, line 14, change "slected" to --selected--.

Signed and Sealed this

Sixth Day of May 1986

[SEAL]

Attest:

DONALD J. QUIGG

Attesting Officer

Commissioner of Patents and Trademarks